(12) United States Patent
Sayal

(10) Patent No.: US 7,529,790 B1
(45) Date of Patent: May 5, 2009

(54) SYSTEM AND METHOD OF DATA ANALYSIS

(75) Inventor: Mehmet Sayal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 796 days.

(21) Appl. No.: 11/045,558

(22) Filed: Jan. 27, 2005

(51) Int. Cl.
*G06F 17/15* (2006.01)

(52) U.S. Cl. ..................................... 708/422

(58) Field of Classification Search ................. 708/422
See application file for complete search history.

(56) References Cited

U.S. PATENT DOCUMENTS

| | | | |
|---|---|---|---|
| 5,276,870 A | 1/1994 | Shan et al. | |
| 5,325,525 A | 6/1994 | Shan et al. | |
| 5,412,806 A | 5/1995 | Du et al. | |
| 5,546,571 A | 8/1996 | Shan et al. | |
| 5,694,591 A | 12/1997 | Du et al. | |
| 5,826,239 A | 10/1998 | Du et al. | |
| 5,870,545 A | 2/1999 | Davis et al. | |
| 5,937,388 A | 8/1999 | Davis et al. | |
| 6,014,673 A | 1/2000 | Davis et al. | |
| 6,041,306 A | 3/2000 | Du et al. | |
| 6,078,982 A | 6/2000 | Du et al. | |
| 6,308,163 B1 | 10/2001 | Du et al. | |
| 6,593,862 B1* | 7/2003 | Wong et al. ................. | 341/87 |
| 6,728,932 B1 | 4/2004 | Chundi et al. | |
| 2003/0023450 A1 | 1/2003 | Casati et al. | |
| 2003/0028389 A1 | 2/2003 | Casati et al. | |
| 2003/0083910 A1 | 5/2003 | Sayal et al. | |
| 2003/0154154 A1 | 8/2003 | Sayal et al. | |
| 2003/0236677 A1 | 12/2003 | Casati et al. | |
| 2003/0236689 A1 | 12/2003 | Casati et al. | |
| 2004/0002911 A1* | 1/2004 | Seilern ........................ | 705/37 |
| 2004/0117478 A1* | 6/2004 | Triulzi et al. ................ | 709/224 |
| 2006/0167825 A1* | 7/2006 | Sayal .......................... | 706/45 |
| 2007/0231933 A1* | 10/2007 | Chien et al. .................. | 438/14 |

* cited by examiner

*Primary Examiner*—David H Malzahn

(57) ABSTRACT

Embodiments of the present invention relate to a method of data analysis, comprising comparing a data point in a data stream and a previous data point in the data stream to identify a change direction of the data point based on a difference between the data point and the previous data point, comparing the change direction with a previous change direction to identify whether a trend change occurred for the data point, and identifying a change point that comprises a discrete data value in the data stream based on the trend change. The method also comprises comparing the change point with other data.

26 Claims, 6 Drawing Sheets

| Event Type | | | | | | | | | |
|---|---|---|---|---|---|---|---|---|---|
| A Upwardly Trending | 1 2 | 6 7 8 9 10 11 12 | | | | 27 | 30 | 33 | 36 | 39 |
| B Downwardly Trending | 3 5 | 13 | 16 | 18 | 20 21 22 23 24 25 | 28 29 | 31 32 | 34 35 | 37 |
| C Flat | 4 404 | | 14 15 | 17 | 19 | 26 | 404 | 404 | 38 |
| D Discrete Event Occurrences | 402 D1 D2 | | 402 D1 | 402 D1 | 402 D1 | 402 D1 | D2 | 402 D2 D1 | |

Time ⟶

400

SYSTEM AND METHOD OF DATA ANALYSIS

BACKGROUND OF THE RELATED ART

In dealing with large amounts of data, data correlation is beneficial because it facilitates the discovery of useful relationships among data associated with certain operations (for example, manufacturing processes, delivery systems and the like). Once discovered, these relationships are often used to improve the associated operations.

Data correlation provides information that can be used for preemptive problem identification and performance optimization. For example, data correlation is often applied on business activity log data to discover correlations among business objects (e.g., how one business object affects other business objects) that can be used to better understand performance issues and thus improve business performance.

One type of data that is often analyzed or correlated is enumeration data, which is data capable of being arranged in a list. Data field entries that comprise enumeration data take one of a limited number of values that can easily be categorized for analysis. For example, a data field used for storing customer names and containing only a few hundred unique data values can easily be categorized as enumeration data. A correlation analysis on such discrete data can yield results like: "When customer name is customer1 then product name is Printer with 60% probability."

Another type of data is numeric data, which is data that can be expressed in numerical terms. Automatically discovering data correlations among discrete enumeration data is relatively easy compared to automatically discovering data correlations among numeric data. This is true because the search space (the number of data points to be compared) is much smaller for discrete data. The discovery of correlations among numeric data sequences typically involves similarity queries. In other words, a database is queried to identify numeric data sequences that meet a given query sequence.

It is difficult to compare numeric data streams with discrete event occurrences using existing techniques because numeric data and discrete data are not comparable. What is needed is a data correlation solution that facilitates the comparison of changes in numeric data streams with discrete event occurrences.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which can vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
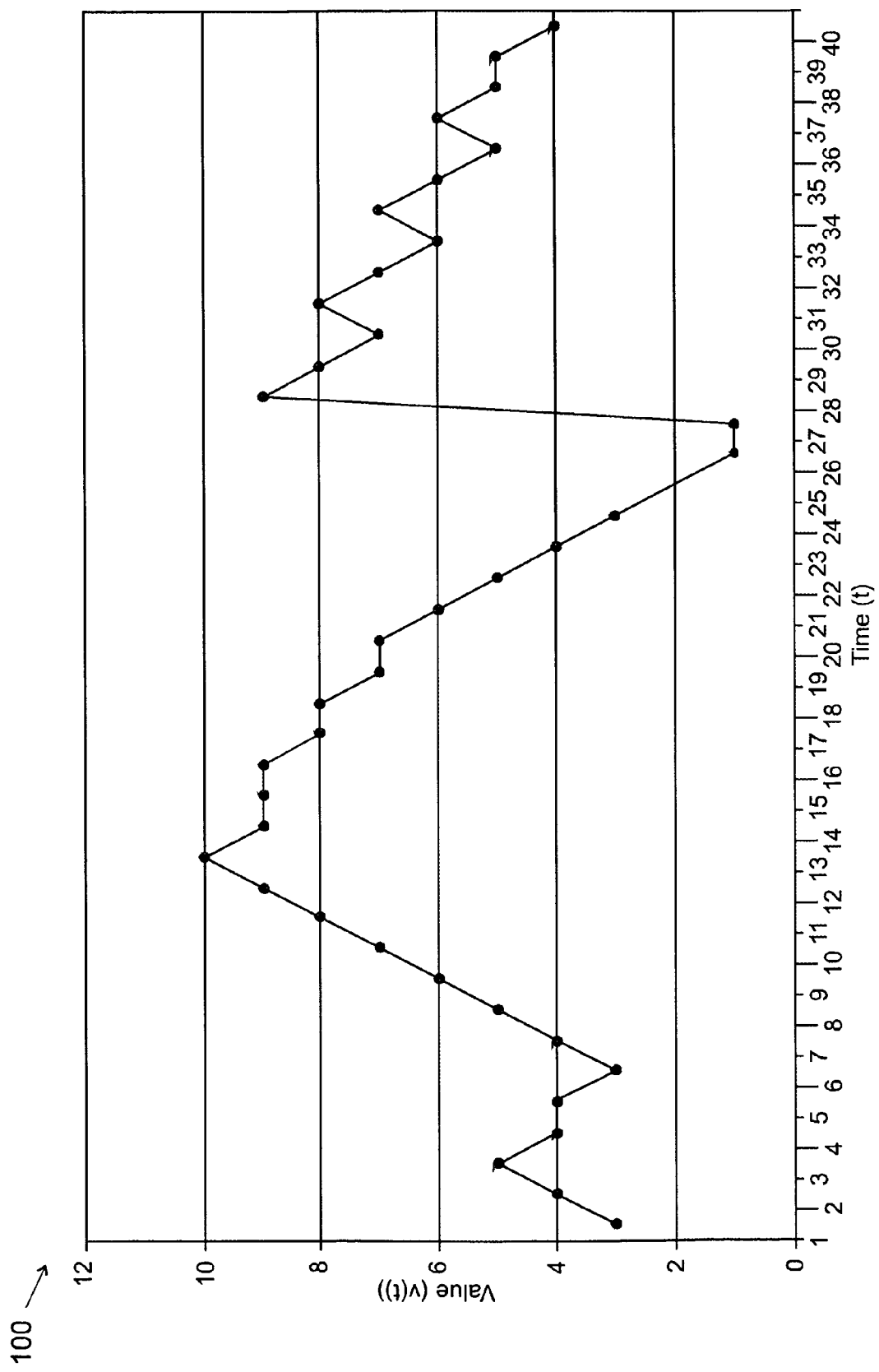
FIG. 1 is a chart illustrating exemplary data for a numeric data stream illustrating one embodiment of the present invention.

FIG. 1 is a chart illustrating exemplary data for a numeric data stream in accordance with embodiments of the present invention. The chart is generally referred to by reference numeral 100. The chart 100 is used herein to describe and provide examples for embodiments of the present invention. Specifically, chart 100 is a plot of a value, v(t), on the Y-axis and a corresponding time, t, on the X-axis.

Figure 2:
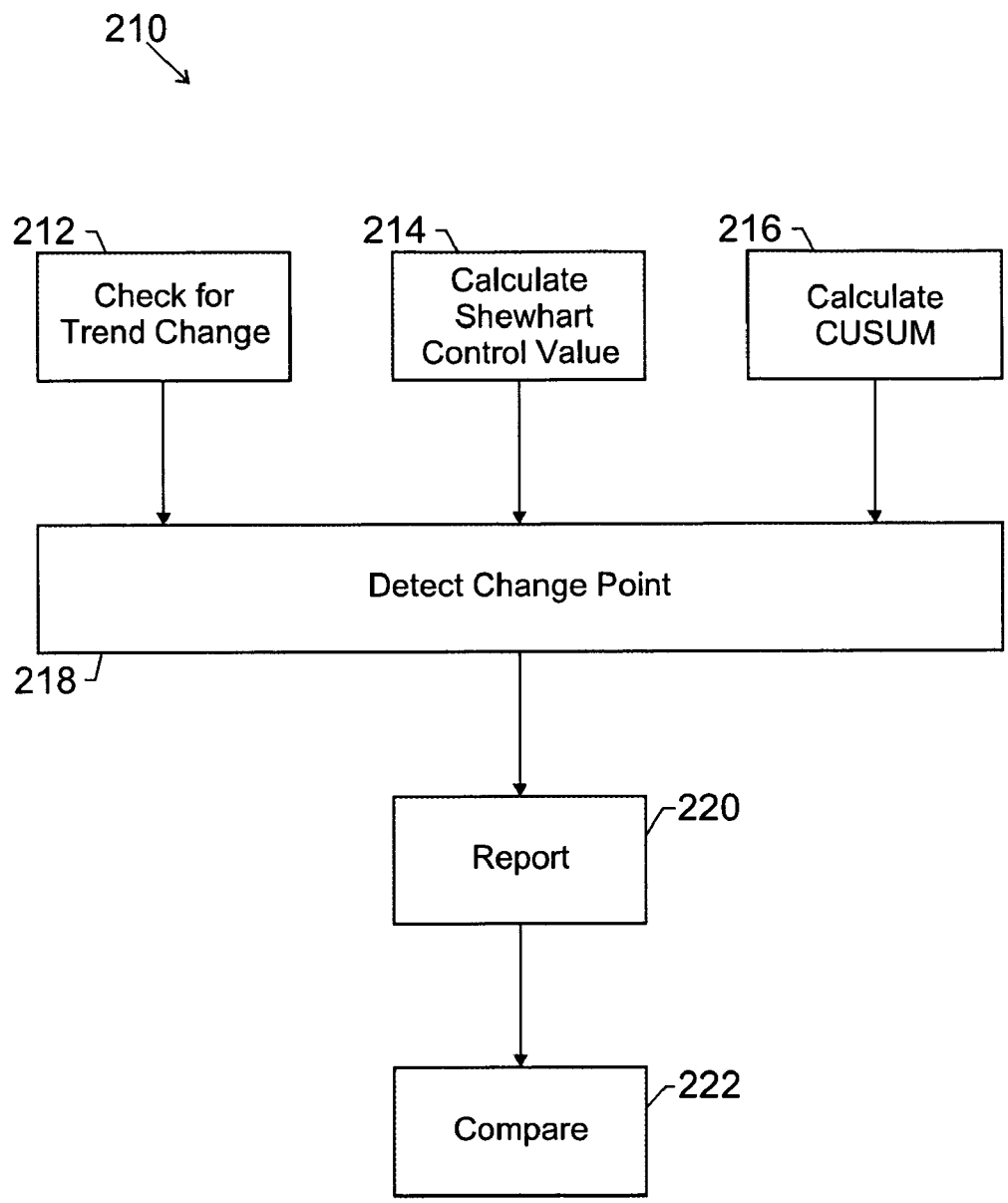
FIG. 2 is a flow diagram illustrating a method for correlating data illustrating one embodiment of the present invention.

FIG. 2 is a block diagram illustrating a method for correlating data illustrating one embodiment of the present invention. The method is generally referred to by reference number 210. While FIG. 2 separately delineates specific method operations, in other embodiments, individual operations are split into multiple operations or combined into a single operation. Additionally, in some embodiments of the present invention, the operations in the illustrated method 210 do not necessarily operate in the illustrated order.

An automatic comparison of numeric data streams with discrete event occurrences is facilitated in accordance with embodiments of the present invention by conversion of one data type into the other. Accordingly, embodiments of the present invention such as that shown in FIG. 2 relate to detecting changes in numeric data streams and comparing the changes with discrete event occurrences. In other words, embodiments of the present invention are directed to converting numeric data streams into data equivalent to discrete event occurrences and comparing them with other discrete event occurrences. Specifically, FIG. 2 illustrates a method for automatically discovering change points or points in time where significant changes occur in an overall trend of numeric data streams. For example, the first trend change in chart 100 (FIG. 1) occurs at time point 3 (t=3), where v(t)=5 and the trend changes from up to down. Because detected change points are similar to discrete event occurrences, they are used for comparing numeric data streams to related discrete event occurrences in accordance with embodiments of the present invention.

In the exemplary embodiment illustrated in FIG. 2, the method 210 comprises six method operations that are performed for each numeric data point in a numeric data stream in accordance with embodiments of the present invention. Specifically, method 210 comprises checking for a trend change (block 212). Checking for a trend change comprises checking for local trend directions in a numeric data stream. A trend change is detected in accordance with embodiments of the present invention if the most recent change in data values is in a different direction than the previous change. Specifically, block 212 comprises identifying a current change direction as "up" (i.e., the latest data value is larger than the previous data value), "down" (i.e., the latest data value is smaller than the previous data value), or "flat" (i.e., the latest data value is equal to the previous data value). In accordance with embodiments of the present invention, once the current change direction is identified, it is compared with a previous change direction to find out if any trend change has occurred in the data. If a trend change is detected, it is marked with the new change direction (e.g., up, down, or flat) in accordance with embodiments of the present invention.

The method 210 next comprises calculating a Shewhart control chart value (block 214). A Shewhart control chart is a control chart that is employed in performing a statistical method for detecting sharp changes in numeric data sequences (such as the transition shown at a point 27 in FIG. 1). A Shewhart control chart comprises a center line that represents an average value of the quality characteristic corresponding to a control state. The center line is a horizontal line along with two other horizontal lines referred to as an upper control limit (UCL) and lower control limit (LCL). In accordance with embodiments of the present invention, the center line, UCL, and LCL are represented by the following equations:

Center Line=$\mu_W + k\sigma_W$

UCL=$\mu_W + k\sigma_W$

LCL=$\mu_W - k\sigma_W$, where W is a simple statistic that measures a continuously varying quality characteristic, $\mu_W$ is the mean of W, $\sigma_W$ is a standard deviation, and k is the distance of the control limits from the center line (expressed in terms of standard deviation units).

A Shewhart value in accordance with embodiments of the present invention is calculated as the difference between a current data value and a previous data value. Shewhart values are calculated at each data point of a data stream in accordance with embodiments of the present invention. The calculated difference at a current point in time is then compared with upper and lower limits in the Shewhart chart to determine if a Shewhart change point exists at the current point in time. The limits are calculated using mean ($\mu$) and standard deviation ($\sigma$) as discussed above. Mean and standard deviation are calculated incrementally or using a moving window as new data is introduced in accordance with embodiments of the present invention. The current mean is used as an expected value and a fraction or factor of standard deviation, k, is used to set the upper and lower limits around the mean. For example, limits in accordance with one embodiment of the present invention are set to $\mu \pm 3\sigma$ (i.e., $\mu + 3\sigma$ for the upper limit and $\mu - 3\sigma$ for the lower limit). In accordance with embodiments of the present invention, $\mu \pm \sigma$ is used to set the limits because a goal is often to find medium and large scale change points (not merely extreme change points).

While the use of a Shewhart control chart is specifically contemplated, those of ordinary skill in the art will appreciate that other types of control charts could be employed in accordance with embodiments of the present invention. Such control charts in accordance with embodiments of the present invention comprise a graph of a characteristic measured or computed from a sample versus a corresponding number or time.

In the embodiment illustrated in FIG. 2, the method 210 additionally comprises calculating a cumulative sum (CUSUM) value (block 216). Some gradual change points (e.g., the gradual increase starting at time point 6 in FIG. 1) are detected in accordance with embodiments of the present invention by using a statistical method such as a cumulative sum. CUSUM is a simple and effective statistical method for detecting sharp changes and gradual changes in numeric sequences. It should be noted that the CUSUM is not the cumulative sum of the data values but the cumulative sum of differences between the values and the average. For example, CUSUM at each data point is calculated in accordance with embodiments of the present invention as follows. First, the mean (or median) of the data is subtracted from the value of each data point. Next, for each point, all the mean/median-subtracted points before it are added. Then, the resulting values are defined as the Cumulative Summary (CUSUM) for each point. CUSUM control charts utilize similar upper and lower limits to those of Shewhart control charts in accordance with embodiments of the present invention. In some embodiments of the present invention, $\mu \pm \sigma$ is used to set limits to find medium and large scale change points.

The CUSUM test is useful for picking out general trends from random noise because noise tends to cancel out as an increasing number of values are evaluated. For example, there are generally just as many positive values of true noise as there are negative values of true noise and these values will generally cancel one another. A trend is visible in accordance with embodiments of the present invention as a gradual departure from zero in the CUSUM. Therefore, in one embodiment of the present invention, CUSUM is used for detecting not only sharp changes, but also gradual but consistent changes in numeric data values over the course of time.

In one embodiment of the present invention, once Shewhart and CUSUM values for every data point are calculated, the calculated Shewhart and CUSUM values are compared with upper and lower thresholds to determine which data points should be marked as change points. The data points for which the CUSUM and/or Shewhart values are above the upper threshold or below the lower threshold are marked as change points. As discussed above, the upper and lower thresholds are determined by computing a standard deviation (i.e. a fraction or factor of standard deviation) in accordance with embodiments of the present invention. In another embodiment of the present invention, the upper and lower thresholds are determined by setting the limits to constant values.

If the CUSUM or Shewhart tests yield a change point, an actual starting point of the change or an actual change point is determined by checking the time of the latest trend change in accordance with embodiments of the present invention. When a change point has been detected by CUSUM or Shewhart control charts, the trend change has already occurred. Accordingly, embodiments of the present invention record trend changes, as discussed above, to determine the actual starting point of change. For example, in accordance with embodiments of the present invention, CUSUM or Shewhart control charts would detect a change point at time point 210 in the example data stream of FIG. 1. However, the actual starting point of the change is at time point 6, where the trend changes from down to up. Embodiments of the present invention also record related information such as change direction, slope, and actual amount of change within a time window around the reported change point. This additional information is used in accordance with embodiments of the present invention for effective comparison of change points with each other or other event occurrences.

In the exemplary embodiment set forth in FIG. 2, the method 210 additionally comprises detecting a change point (block 218), reporting the change point (block 220), and comparing the change point with discrete event occurrences (block 222). Accordingly, as discussed above, method 210 comprises converting a numeric data stream into change points and comparing the change points with related discrete data. The comparison of change points and related discrete data yield correlations or relationships that can be used to improve operations and so forth in accordance with embodiments of the present invention. Further, it should be noted that data correlation in accordance with embodiments of the present invention includes the identification of causal, complementary, parallel, or reciprocal relationships between two or more comparable data points.

Figure 3:
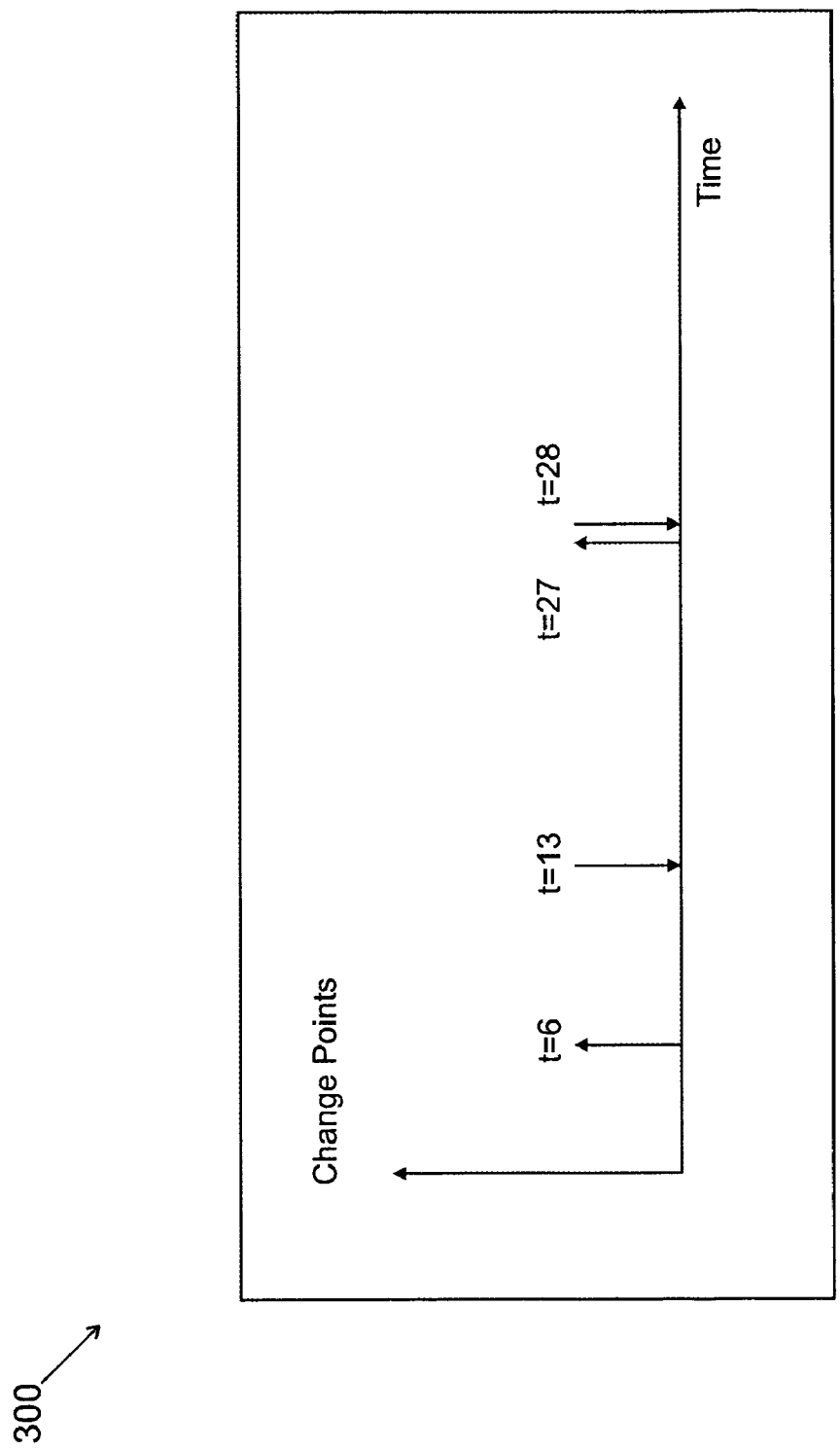
FIG. 3 is a graph illustrating exemplary detected change points illustrating one embodiment of the present invention.

FIG. 3 is a graph illustrating exemplary detected change points illustrating one embodiment of the present invention. The graph in FIG. 3 is generally referred to by reference numeral 300. Specifically, graph 300 illustrates exemplary change points detected from the example data stream illustrated by FIG. 1. Change points detected in accordance with embodiments of the present invention are a special type of discrete event occurrence for which certain parameters are recorded (e.g., direction, slope, change amount). Once change points are established, the change points are labeled in accordance with embodiments of the present invention. In one embodiment of the present invention, the detected change points are marked with labels indicating the direction of the detected change. For example, in one embodiment, a point is marked "Down" where a trend of data values changes from up to down and a point is marked "Up" where a trend of data values changes from down to up. Further, an amount of change is recorded for each change point in accordance with embodiments of the present invention. In graph 300, the change points are indicated by directional arrows indicating change direction and the time value at each change point.

Figure 4:
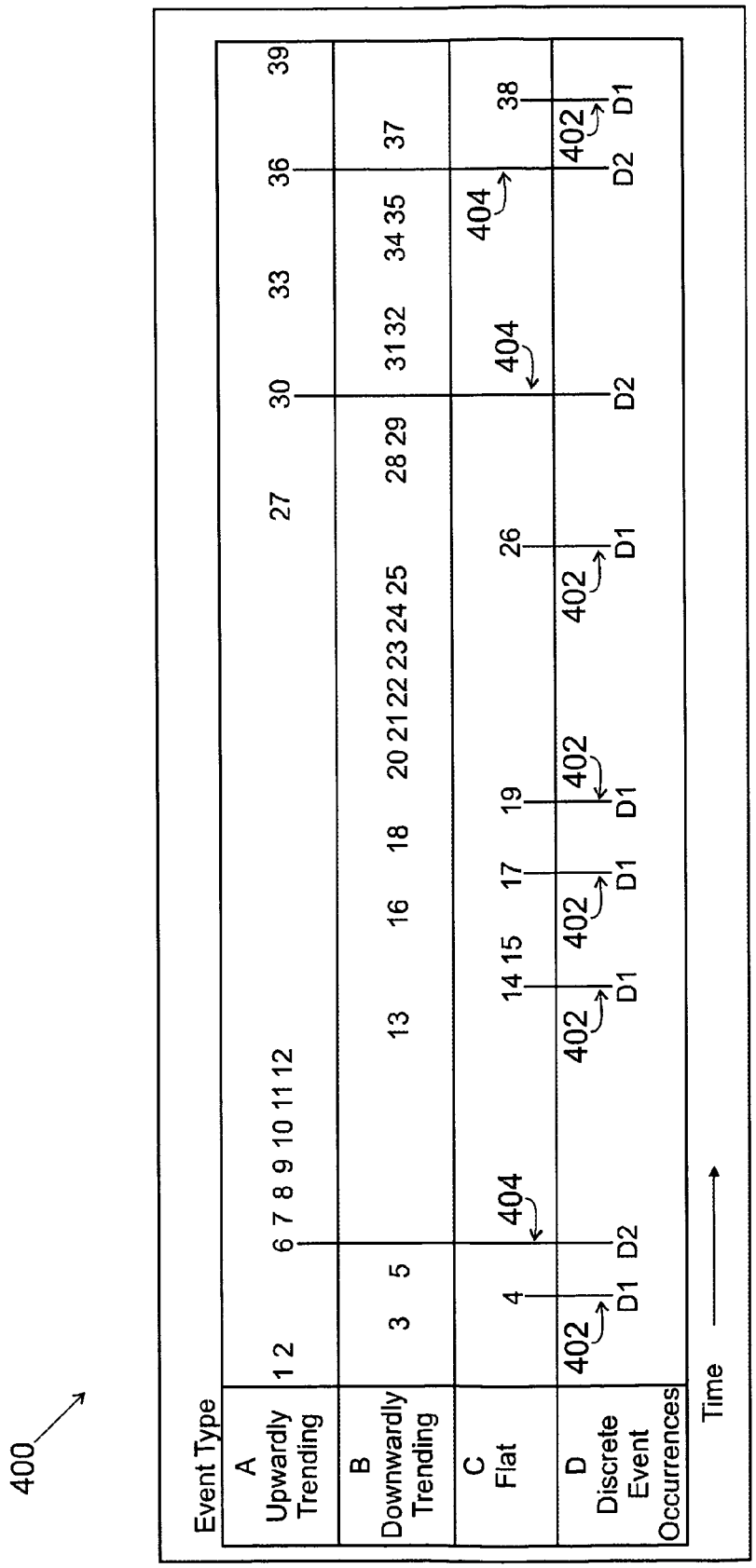
FIG. 4 is a graph illustrating exemplary event occurrences illustrating one embodiment of the present invention.

FIG. 4 is a graph illustrating exemplary event occurrences in accordance with one embodiment of the present invention. The graph in FIG. 4 is generally referred to by reference numeral 400. Once change points are detected in accordance with embodiments of the present invention, the change points are compared with each other or with various event occurrences using discrete event correlation methods. When change points are compared directly with events (e.g., without considering direction or other attributes), visible correlations are often not present. However, when other attributes (e.g., directions of change points) are considered, correlations are typically more readily observed. For example, in one embodiment of the present invention, upward change points relating to the value of a company's product are generally correlated with discrete occurrences of low supply of that product based on a comparison of the events and the specific type of change point. Thus, a relationship between the upward change in value of the company's product and low supply of that product is established. Similarly, another relationship may be established when downward change points relating to such a value are correlated with discrete occurrences of high supply, and so forth. It should be noted that other attributes of the change points, such as slope (e.g., steep or gradual), are also identified and compared in accordance with embodiments of the present invention.

Graph 400 illustrates four types of event occurrences (i.e., A, B, C and D) that can be recorded by an event manager system in accordance with embodiments of the present invention. Graph 400 corresponds to the example data illustrated in FIG. 1. Specifically, graph 400 illustrates event occurrences comprising change points from FIG. 1 that are categorized into upwardly trending change points (i.e., type A), downwardly trending change points (i.e., type B), and flat change points (i.e., type C). Graph 400 also illustrates other discrete event occurrences (i.e., type D) for comparison with the change points. For example, as illustrated by correlation lines 402, analysis of graph 400 in accordance with embodiments of the present invention results in a correlation between a discrete event D1 and flat trending change points. Similarly, as illustrated by correlation lines 404, a discrete event D2 is correlated with upwardly trending change points in accordance with embodiments of the present invention. It should be noted that the discrete events represent any number of events corresponding in time. In an exemplary embodiment, D1 represents a process alarm (e.g., a certain pressure level in a gas plant has been exceeded). Additionally, it should be noted that in accordance with embodiments of the present invention, the events need not correspond exactly for a correlation or relationship to be identified.

Embodiments of the present invention take into consideration several factors when comparing detected change points with each other or with various other event occurrences. For example, embodiments of the present invention take the following parameters into account: time delays (e.g., time delays between occurrences of consecutive events or change points of the same type), direction (e.g., direction of detected change points), slope (e.g., slope of change points, which can be converted into a magnitude scale that uses an enumeration value as an indicator of change amount or slope around the detected change point), and event parameters (e.g., any parameters available from event occurrences). In accordance with embodiments of the present invention, change points and event occurrences are categorized by the factors listed above and comparisons are made across such categories. The change points and event occurrences are also compared in accordance with embodiments of the present invention by ignoring all such factors to identify any correlations existing at a more generic level.

Comparisons in accordance with embodiments of the present invention are carried out visually by comparing occurrence patterns of change points and various event types. Additionally, comparisons in accordance with embodiments of the present invention are automatically made by categorizing occurrences and comparing them across such categories. In accordance with embodiments of the present invention, a comparison algorithm is established wherein a highest-level (most generic) level is established as a category and includes all event occurrences within an event type or all change points for a particular data stream. Lower-level categories are established in accordance with embodiments of the present invention wherein change points or event occurrences are divided into smaller groups that have a particular set of parameters in common.

Performing data correlation in accordance with embodiments of the present invention is beneficial in various different computing fields including, data analysis, data mining, forecasting, and so forth because it makes possible the identification of interesting and useful relationships among data. An exemplary comparison of change points and discrete occurrences may proceed as follows. A user may visually recognize that certain change points marked as upwardly trending correspond to certain discrete events (e.g., upward trending market demand corresponds to supply being below a designated value). Alternatively, in accordance with embodiments of the present invention, an algorithm categorizes such change points and discrete events together based on repeated occurrences. Once such a correlation is made, the relationship between such change points and discrete events are applied in various fields. For example, certain discrete events might predict future market values in forecasting. In another example, certain discrete events (e.g., a birth date) may assist in data mining to predict personal interests.

Figure 5:
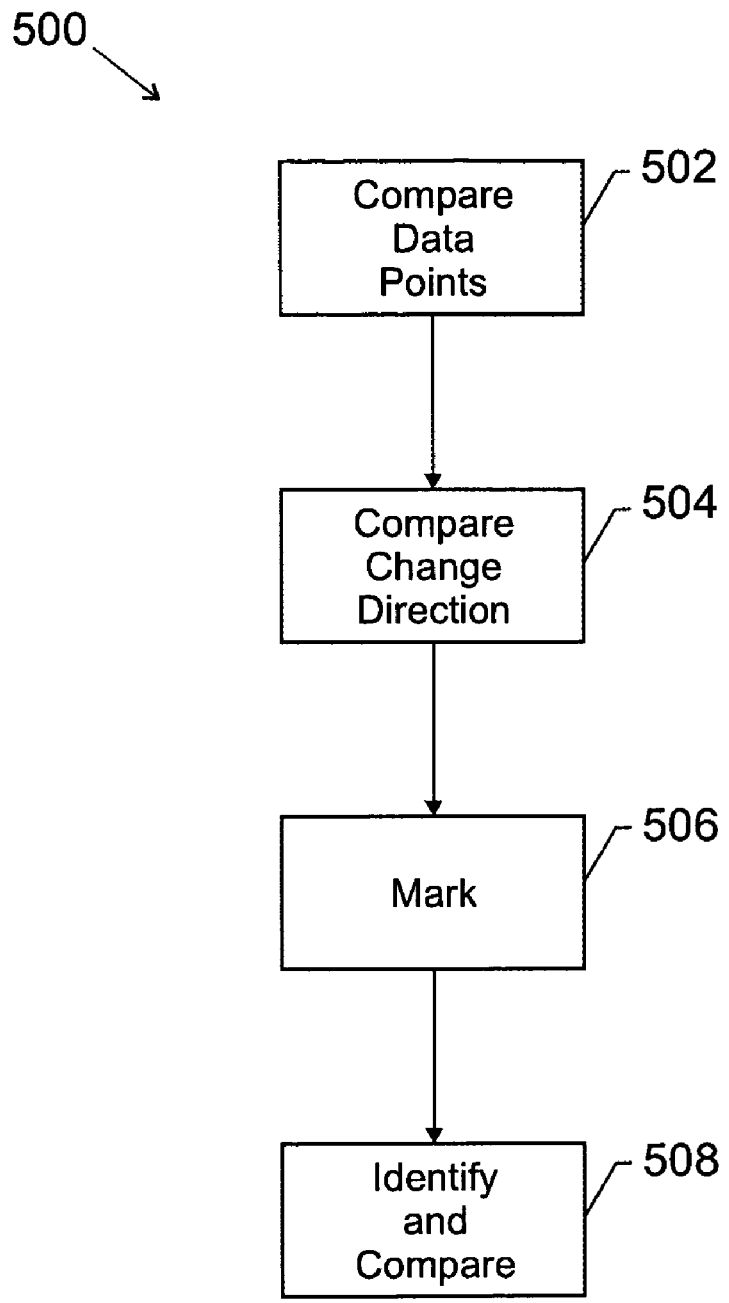
FIG. 5 is a block diagram illustrating a system for correlating data illustrating one embodiment of the present invention.

FIG. 5 is a flow diagram showing an exemplary process illustrating one embodiment of the present invention. The illustrated process is generally referred to by reference numeral 500. Specifically, in process 500, block 502 represents comparing a data point in a data stream and a previous data point in the data stream. This comparison (block 502) in accordance with embodiments of the present invention results in identifying a change direction of the data point based on a difference between the data point and the previous data point. Block 504 represents comparing the change direction with a previous change direction to identify whether a trend change occurred for the data point. Block 506 represents marking the data point with a trend change marker if the trend change occurred. Block 508 represents identifying a change point in the data stream based on the trend change marker (block 506) and comparing the change point with a discrete event occurrence. In one embodiment of the invention, block 508 represents establishing a relationship between the change point data and discrete event occurrences.

Figure 6:
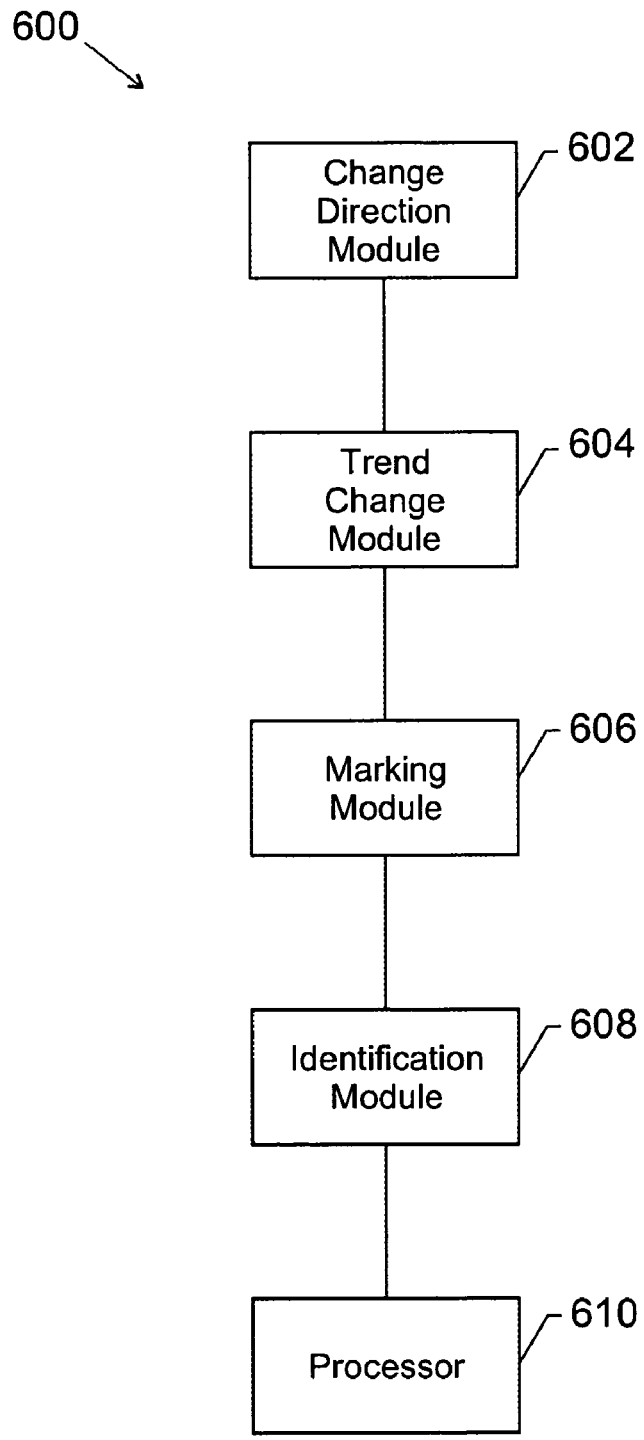
FIG. 6 is a block diagram illustrating a system for correlating data illustrating one embodiment of the present invention.

FIG. 6 is a block diagram showing an exemplary system illustrating one embodiment of the present invention. The illustrated process is generally referred to by reference numeral 600. Specifically, in process 600, block 602 represents a change direction module for comparing a data point in a data stream and a previous data point in the data stream. This change direction module (block 602) is adapted to identify a change direction of the data point based on a difference between the data point and the previous data point. Block 604 represents a trend change module adapted to compare the change direction with a previous change direction to identify whether a trend change occurred for the data point. Block 606 represents a marking module adapted to mark the data point with a trend change marker if the trend change occurred. Block 608 represents an identification module adapted to identify a change point in the data stream based on the trend change marker (block 606) and compare the change point with a discrete event occurrence. Block 610 represents a processor or central processing unit. The processor 610 operates in accordance with embodiments of the present invention to direct signals from one component to another.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of data analysis, comprising:
    comparing a data point in a data stream and a previous data point in the data;
    stream to identify a change direction of the data point based on a difference between the data point and the previous data point;
    comparing the change direction with a previous change direction to identify whether a trend change occurred for the data point;
    identifying a change point that comprises a discrete data value in the data stream based on the trend change;
    comparing the change point with discrete data; and
    identifying a process alarm event that corresponds to the change point in the data stream.

2. The method of claim 1, comprising calculating a Shewhart control chart value using the data point and previous data point to identify whether the change point exists based on a magnitude change.

3. The method of claim 1, comprising calculating a cumulative sum value using the data point and previous data point to identify whether the change point exists based on a magnitude of change.

4. The method of claim 1, comprising calculating a cumulative sum value using the data point and previous data point to identify whether the change point exists based on a magnitude of change only if a first technique does not detect that the change point exists.

5. The method of claim 1, comprising identifying a relationship, if any, between the change point and a plurality of event occurrences.

6. The method of claim 1, comprising identifying a relationship, if any, between a slope relating to the change point and a discrete event occurrence.

7. The method of claim 1, comprising identifying a relationship, if any, between a change point and another change point.

8. The method of claim 1, comprising categorizing the change point with a plurality of change points based on parameters of the change point similar to parameters of the plurality of change points.

9. The method of claim 8, comprising categorizing the change point with the plurality of change points based on a time delay parameter of the change point.

10. The method of claim 1, comprising:
    marking the data point with a trend change marker if the trend change occurred;
    and
    identifying the change point in the data stream based on the trend change marker.

11. The method of claim 1, comprising comparing the change point with a discrete event occurrence.

12. A system for data analysis, comprising:
    a processor configured to operate a series of modules, wherein the modules comprise:
    a change direction module adapted to compare a data point in a data stream and a previous data point in the data stream to identify a change direction of the data point based on a difference between the data point and the previous data point;
    a trend change module adapted to compare the change direction with a previous change direction to identify whether a trend change occurred for the data point;
    a change point module adapted to identify a change point that comprises a discrete data value in the data stream based on the trend change; and
    an event module adapted to compare the change point with a discrete event occurrence.

13. The system of claim 12, comprising a Shewhart control chart module adapted to calculate a Shewhart control chart value using the data point and previous data point to identify whether the change point exists based on a magnitude change.

14. The system of claim 12, comprising a cumulative sum module adapted to calculate a cumulative sum value using the data point and previous data point to identify whether the change point exists based on a magnitude of change.

15. The system of claim 12, comprising a cumulative sum module adapted to calculate a cumulative sum value using the data point and previous data point to identify whether the change point exists based on a magnitude of change only if the first technique does not detect that the change point exists.

16. The system of claim 12, comprising a comparison module adapted to compare the change point to a plurality of event occurrences.

17. The system of claim 12, comprising a slope comparison module adapted to compare a slope of the change point with the discrete event occurrence.

18. The system of claim 12, comprising a change point comparison module adapted to compare the change point to another change point.

19. The system of claim 12, comprising a categorization module adapted to categorize the change point with a plurality of change points based on parameters of the change point.

20. The system of claim 19, wherein the categorization module is adapted to categorize the change point with the plurality of change points based on a time delay parameter of the change point.

21. The system of claim 12, comprising a marking module adapted to mark the data point with a trend change marker if the trend change occurred.

22. The system of claim 21, comprising an identification module adapted to identify the change point in the data stream based on the trend change marker.

23. A system for data analysis, comprising:
processing means for comparing a data point in a data stream and a previous data point in the data stream to identify a change direction of the data point based on a difference between the data point and the previous data point;
processing means for comparing the change direction with a previous change direction to identify whether a trend change occurred for the data point;
processing means for identifying a change point in the data stream based on the trend change; and
processing means for comparing the change point with other data.

24. A method of data analysis, comprising:
comparing a data point in a data stream and a previous data point in the data stream to identify a change direction of the data point based on a difference between the data point and the previous data point;
calculating a Shewhart control chart value using the data point and previous data point to identify whether a trend change occurred for the data point based on a magnitude of change;
marking the data point with a trend change marker if the trend change occurred;
identifying a change point in the data stream based on the trend change marker;
comparing the change point with a discrete event occurrence; and
identifying a process alarm event that corresponds to the change point in the data stream.

25. A method of data analysis, comprising:
comparing a first data point in a first data stream in a manufacturing process and a second data point in the first data stream in the manufacturing process to identify a change direction of the first data point based on a difference between the first data point and the second data point;
comparing the change direction of the first data point with a previous change direction relating to the first data stream in the manufacturing process to identify whether a trend change occurred for the first data point;
identifying a change point in the first data stream in the manufacturing process based on the trend change;
comparing a third data point in a second data stream in the manufacturing process and a fourth data point in the second data stream to identify a change direction of the third data point based on a difference between the third data point and the fourth data point;
comparing the change direction of the third data point with a previous change direction relating to the second data stream in the manufacturing process to identify whether a trend change occurred for the third data point;
identifying a change point in the second data stream in the manufacturing process based on the trend change;
comparing the change point in the first data stream in the manufacturing process with the change point in the second data stream in the manufacturing process; and
identifying a correlation between the change point in the first data stream in the manufacturing process and the change point in the second data stream in the manufacturing process.

26. A method of data analysis, comprising:
converting numeric data streams representing physical occurrences into data representing discrete events;
comparing the data representing discrete events to actual discrete events; and
identifying a correlation between the actual discrete events and the numeric data stream, wherein the discrete events represent process alarm events.

* * * * *